UNITED STATES PATENT OFFICE.

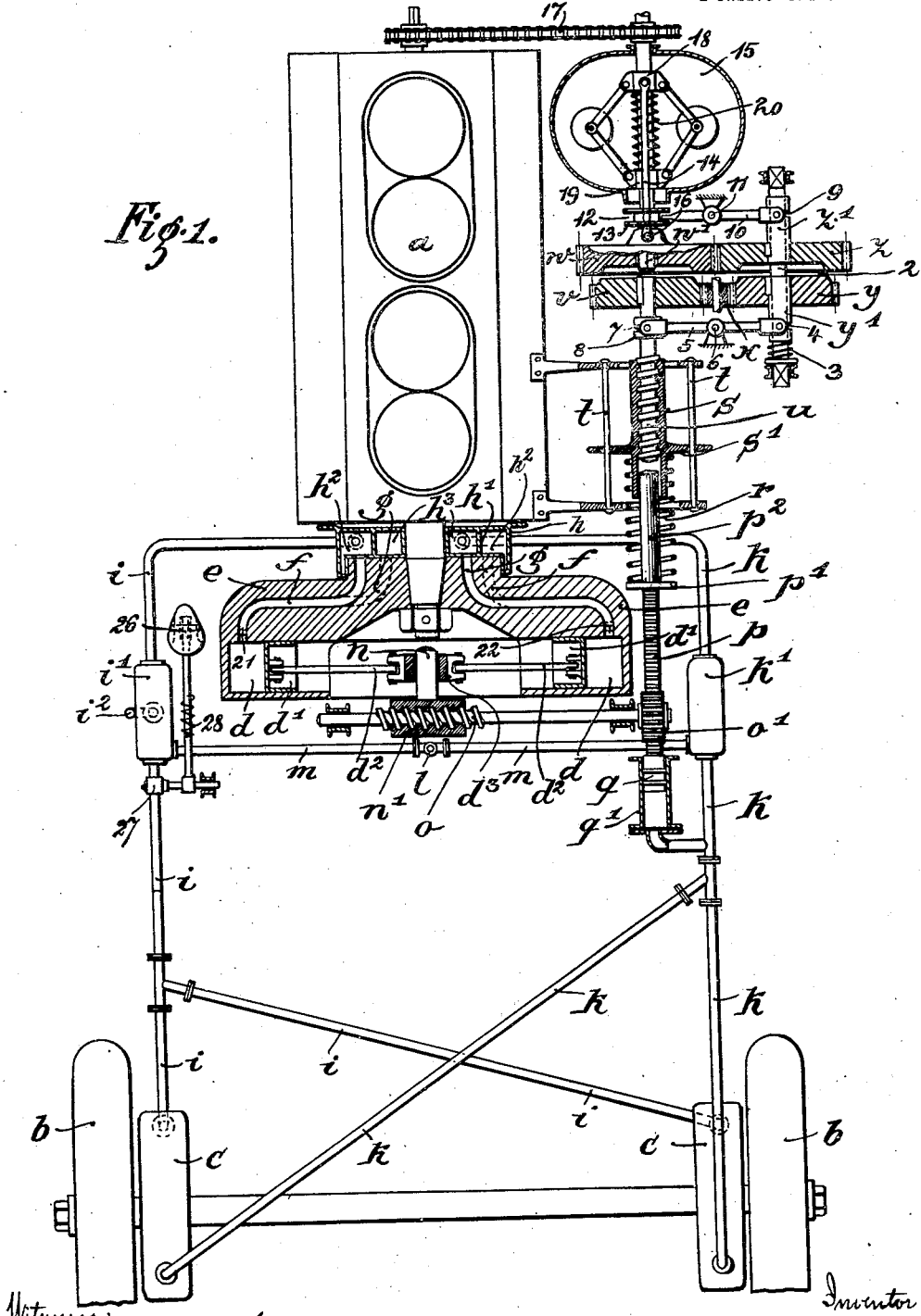

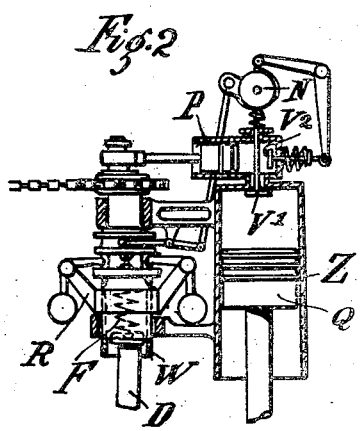
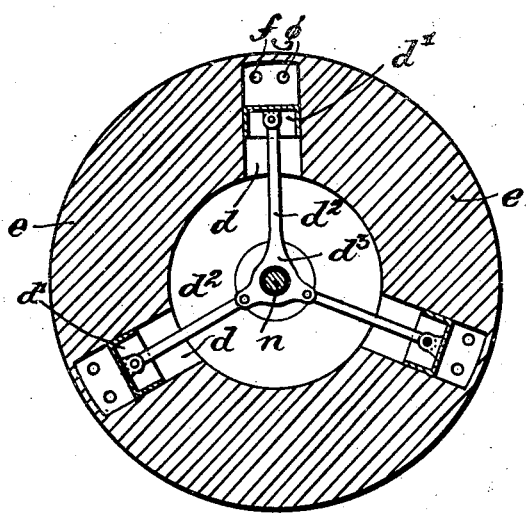

GEORG von SAALFELD, OF MUNICH-HARLACHING, GERMANY.

GEAR FOR ATTAINING A COMPENSATION BETWEEN DRIVING POWER AND LOAD.

1,172,412.   Specification of Letters Patent.   Patented Feb. 22, 1916.

Application filed March 5, 1915. Serial No. 12,422.

*To all whom it may concern:*

Be it known that I, GEORG VON SAALFELD, a citizen of the German Empire, and residing at 12 Ueber der Klause, Munich-Harlaching, Bavaria, German Empire, have invented a certain new and useful Improved Gear for Attaining a Compensation Between Driving Power and Load, of which the following is a full, clear, and exact description.

The present invention relates to a gear for attaining a compensation between driving power and load and is especially adapted for a machine with strongly varying resistance driven by means of a motor subject to overloading, such, for instance, as an internal combustion motor.

In my present invention I provide means as an internal combustion engine for developing the desired power, this power being applied through a fluid medium to a motor carrying the load, by means of a hydraulic pump of variable capacity. In connection with this arrangement of parts I provide means controlled by the engine speed or power, whereby there is a normal tendency to vary the capacity of the pump in accord with the speed, or power, of the engine, supplemental means being provided whereby variance in the capacity of the pump will be modified by variance of the load upon the motor to cause the pump to respond to such variance in the load, in a manner to prevent an additional load upon the engine.

For carrying the invention into effect a finely adjustable gear of any desired kind, such, for instance. as friction wheels, expanding pulleys, Newman-gears or the like, must be employed. By using the invention, hereafter more fully to be explained, the number of rotations of the driving engine will remain entirely uninfluenced by the adjustment in the gear on the one hand, while on the other hand the adjusting device is automatically adjusted for each number of revolutions of the driving engine. In other words there is a normal tendency of the gear to operate to bring the capacity of the pump into accord with the engine speed, the term "capacity of the pump" relating merely to the volume of the fluid maintained in circulation during a given interval, or the rate of flow of this fluid. It must be understood that the capacity of the pump ordinarily varies in inverse ratio to the power required to carry the load. The normal tendency of this arrangement would be to maintain the pump capacity in accord with that of the engine speed, were it not that I provide means, controlled by the load conditions, whereby the action of the gear in controlling the capacity of the pump is modified in a way to vary the capacity of the pump in accordance with the variances in the load, without, however, having any effect upon the engine speed.

In order to render the present invention more easily intelligible, a form of embodiment of the subject matter of invention relating to the hydraulic transfer of the working capacity of an automobile motor to driving pump is shown in the accompanying drawings in which—

Figure 1 is a plan view, partly in section of the preferred form of the invention. Fig. 2 is a view of a modified construction of the mechanical regulator, and Fig. 3 is a detailed sectional view of the pump.

Like letters refer to like parts throughout the several views.

Referring to the accompanying drawing, and especially to Fig. 1, $a$ is an automobile motor and $b$ are the rear wheels of the automobile. $c$ are hydraulic driving motors connected with the said rear-wheels. $e$ is a fly-wheel and $d$ are the pump cylinders arranged in the same. $f$ are suction channels and $g$ pressure channels, also provided in the fly-wheel. $h$ is a driving medium receptacle, adjacent to the fly-wheel and $h'$ a partition wall, subdividing the said receptacle $h$ into two annular chambers $h^2$, $h^3$, of which $h^2$ serves for admitting the driving medium from the suction conduit $i$ to the suction channels $f$ and $h^3$ for leading off the pressure liquid from the pressure channels to the pressure conduit $k$. In the conduits $i$, $k$ compensation receptacles $i'$, $k'$ may be inserted, which communicate with a transfer conduit $m$, having an automatically operating valve $l$. This check valve $l$ is so set that the liquid in the pressure conduit $k$ cannot flow to the compensation receptacle $i'$, but the liquid in the suction conduit can flow from the receptacle $i'$ to the receptacle $k'$, when the motors $c$ are running at a speed greater than their normal speed with the maximum rate of flow of the liquid thereto through the conduit $k$. Under this condition, the pipe $m$ serves as a bypass to prevent back pressure from the motors $c$ upon the pump. To the compensation-receptacle $i'$ a rising-tube $i^2$ may be attached, which permits an expansion of the driving medium, when the temperature rises, and a compensation of a loss of liquid due to leakage.

The pistons $d'$ of the pump cylinders $d$ are by means of the piston rods $d^2$ connected with a guiding piece $d^3$. Said guiding piece is mounted upon a pivot $n$, which is mounted on the traveler $n'$. The said traveler is hollow and provided with inner screw thread, and is adapted to be moved in the one or other direction by a screw-spindle $o$. In place of this piston-pump any other kind of pump may be employed, the stroke of which may be varied from zero to a maximum.

$o'$ is a toothed wheel, located on the free end of the screw-spindle $o$ and engaging a rack $p$, which is attached to a piston $q$ the casing $q'$ of which communicates with the pressure conduit $k$. The other end of the rack $p$ carries a collar $p'$ and terminates in a rod $p^2$, around which a helical spring $r$ is placed. This spring is seated between the collar $p'$ and a flange $s'$ of a screw threaded sleeve $s$, which is held against rotation by means of guides $t$ or in any other suitable manner. Said sleeve may be moved axially by means of the screw-threaded spindle $u$.

In place of the helical spring any other suitable compensation means, so, for instance, a pressure air cylinder, pendulum weights or the like may be employed.

To the end of the screw-spindle $u$ a toothed wheel $v$ is keyed, which is embodied as stationary member of a clutch, the movable member of which i. e. a toothed wheel $w$, is movably located upon the square-part of a shaft $w'$. The toothed wheel $v$ is by means of an intermediary toothed wheel $x$ in engagement with a toothed wheel $y$, while the toothed wheel $w$ engages a toothed wheel $z$. The toothed wheels $y$ and $z$, formed as clutch members, are located upon sleeves $y'$, $z'$, movable on the shaft 2. The sleeve $y'$ is acted upon by a spring 3 and possesses an annular groove 4, into which the forked end of a two-armed lever 5 engages, which revolves around the pivot 6, while the other forked end of the said lever 5 engages an annular groove 7 of a sleeve 8, which is slidable on the screw-spindle $u$.

9 is an annular groove in the sleeve $z'$, in which the forked end of a two armed lever 10 engages, which is pivotally located at 11. The other forked end engages an annular groove 12 of a stop 13, placed upon the pulling-rods 14 of the regulator 15 (Fig. 1), which pulling-rods are at 16 pivoted to the hub of the toothed wheel $w$. Instead of employing this reversing-gear any other known equivalent device may be used.

The regulator 15 is operated by chain gear 17 from the shaft of the motor $a$. 18 is the movable and 19 the stationary regulator-sleeve. The former is under the control of the spring 20 while the latter is adjustable. 21 and 22 are the suction- and pressure-valves of the pump-channels $f$ and $g$ respectively.

26 is a foot-brake, by means of which a brake-valve 27, arranged in the suction-conduit $i$, may be operated, the said brake 26 being under the influence of a spring 28.

The operation of the device is as follows:—Supposing the parts occupy the positions shown in Fig. 1 no power can be transmitted by the motor through the pipes $i$, $k$ to the rear-wheel motor $c$, as the central axis of the pivot $n$ in the traveler or slide $n'$ coincides with the central axis of the shaft of the motor $a$ and thus the pistons $d'$ of the fly-wheel pump $d$ are in their position of rest, the compensation spring $r$ being inoperative. This position is also retained when the motor is started, but is moving with a speed to be considered as a medium speed or as a normal one for the idle run, which cannot cause a displacement of the device by means of the centrifugal-regulator 15. When the engine speed, however, exceeds the idling speed or the minimum speed for which the regulator is set, the regulating device is actuated, coming to rest when the engine reaches the maximum speed, this actuation of said regulator varying the position of the pivot $n$ to make the pump operative. With the actuation of said regulator, the spring $r$ is compressed, the actuation of the pump resulting in such a movement of the piston $q$ as to control said spring in a manner to insure a capacity of the pump equal to the requirements of the load upon the motor $c$. The spring $r$ is compressed for an amount, so that its tension corresponds to the pressure exerted upon the piston $q$, i. e. the pressure of the liquid in the conduit $k$. Accordingly also the position of the slide $n'$ with its pivot $n$ is changed and thereon depends the extent of the pressure stroke of the pistons $d'$. The latter suck the driving medium through the suction channels $f$, from the conduit $i$ and from the receptacle $h^2$, compress the same and force it through the pressure channels $g$ and the receptacle $h^3$ into the pressure conduit $k$, from which it enters, in a working condition, the rear wheel motors $c$. As the running resistance increases, the pressure in the conduit $k$ and in turn in the cylinder $q'$ increases whereby the piston $q$ is moved forward and in turn the spindle $o$ is turned by means of the toothed wheel $o'$, so that the slide $n'$ with the pivot $n$ is displaced in such a manner that the working stroke of the piston $d'$ is diminished, while the speed of the motor $a$ remains the same. In case the running resistance is decreased the same operations in a reversed order occur. If a quick braking of the gear be desired it is only necessary to shut up the suction conduit $i$ more or less by operating the foot lever 26. If the speed of the motor is reduced by any circumstances, as for instance, when running upon hills, the regulator moves in an inward direction, while the sleeve 18 under the influence of the spring 20 moves forward. If prior to this the coupling member $w$ was in engagement with the part $v$, such engagement is released in that the coupling member $w$ is pulled forward by means of the regulator rods 14. At the same time the collar 13 and the lever 10, depress the coupling part $z$, mounted on the sleeve $z'$ so that it engages the toothed wheel $y$, causing movement of the toothed wheel $w$ by the intervention of the intermediary wheel $x$ to be transmitted to the toothed wheel $v$ whereby the latter is driven in a direction opposite to the direction of rotation of the toothed wheel $w$. Consequently, the spindle $u$ moves the sleeve $s$, toward the the regulator 15, whereby the spring $r$ is released for a corresponding amount and, owing to the overpressure of the driving medium at $q$, the spindle $o$, operated by the toothed wheel $o'$, effects a movement of the slide $n'$ with its pivot $n$ (Fig. 1 toward the left), until the pressure in the conduit $k$ and the pressure of the spring $r$ are balanced again. It follows that the working stroke of the piston $d'$ is diminished and the speed of the engine increases again. With the increasing speed of the engine $a$ the regulator-rods 14 are pressed rearwardly by means of the correspondingly revolving governor 15 and, as soon as the normal speed is attained the toothed wheels $z$ and $y$ are disengaged.

Should it occur that the sleeve $s$ is so excessively moved that it strikes against the coupling-member $v$, the lever 5 may disengage the coupling-member $y$ from the toothed wheel $z$. The sleeve will in this case strike the loosely mounted grooved collar 8, move the same in forward direction and thereby effect a pulling back of the sleeve $y$ against the pressure of the spring 3.

In case the speed of the motor exceeds the normal measure the regulator rod 14 is pressed back by means of the swinging pendulums of the regulator 15 and the wheel $w$ is placed in engagement with the wheel $v$. Thereby the wheel $v$ and in turn the screw spindle $u$ are moved in the same direction as the wheel $w$, the sleeve $s$ is moved backward and the spring $r$ set, so that the piston $q$ is moved backward until the power is compensated. By means of the rack $p$ the toothed wheel $o'$ is revolved and thereby the slide $n'$ with the pivot $n$ moved outwardly so that owing to the greater eccentricity the stroke of the pistons $d'$ and in turn the work to be done by the motor is increased, whereby the return of the motor $a$ to its normal speed is secured.

The operative effect of the invention is not materially altered in case the reversing gear does not regulate the spring resistance, as with this condition pressure in the pipe $k$ and cylinder $q'$ will increase proportionately and thus compensate for the excess tension of the spring $r$ and thus regulate the power stroke of the pistons $d$ to conform to the desired rate of flow of the liquid to the motors $c$.

In Fig. 2 a form of embodiment is shown according to which instead of the spring $r$ (Fig. 1) a pressure-air-cylinder Z is provided, the piston Q of which is rigidly connected to the piston $q$ (Fig. 1). The spring F of the regulator R is located in the hollow shaft W. The tension of the spring F may be regulated by means of the rod D operatively connected with the controller for the gas supply, or the ignition, thus varying the spring resistance to the movement of the governor balls, in accord with the speed for which the engine may be set.

The regulator R acts upon the pressure in the cylinder Z by reversing the valves $V'$ and $V^2$ by means of cams N.

When the engine is idling, the valve $V^2$ is fully opened thus relieving the pressure in the pump P. With a working engine speed, however, the valve $V^2$ closes and the valve $V'$ opens, causing air to be forced under pressure into the cylinder Z with a resultant increase in the effective stroke of the pistons $d$. With a decrease in the engine speed, the valve $V^2$ is opened by the governor R, relieving the pressure in the cylinder Z through said valve, both valves $V'$—$V^2$ being partly opened during the change from one speed to the other.

It is evident that a change for establishing a compensation between the running resistance and the driving power takes place, as far as possible retaining the normal number of rotations of the motor.

I claim as my invention:—

1. A gear for attaining compensation between driving power and load embodying therein in combination with an engine, a hydraulic pump driven by said engine, a hydraulic motor, pipes between the inlet and the exhaust of said motor and the pressure side and the suction side of said pump forming a closed circulating system, means adapted to vary the capacity of said pump independently of the power applied thereto by said engine, a mechanical regulator operatively connected with said engine and having a normal tendency to vary the capacity of said pump in accord with a varying engine speed, operative connections between said regulator and said means, a fluid pressure regulator operatively connected with the pipe leading from the pressure side of said pump, and operative connections between said fluid pressure regulator and said connections between said mechanical regulator and the means controlling the capacity of the pump whereby variance in the load upon the hydraulic motor will vary the capacity of said pump without varying the load upon the engine.

2. A gear for attaining compensation between driving power and load embodying therein in combination with an engine, a hydraulic pump driven by said engine, a hydraulic motor, pipes between the inlet and the exhaust of said motor and the pressure side and the suction side of said pump forming a closed circulating system, means adapted to vary the capacity of said pump independently of the power applied thereto by said engine, a mechanical regulator operatively connected with said engine and having a normal tendency to vary the capacity of said pump in accord with a varying engine speed, a compressible member interposed between said regulator and said means, a fluid pressure regulator operatively connected with the pipe leading from the pressure side of said pump, and operative connections between said fluid pressure regulator and said connections between said mechanical regulator and the means controlling the capacity of the pump whereby variance in the load upon the hydraulic motor will vary the capacity of said pump without varying the load upon the engine.

3. A gear for attaining compensation between driving power and load embodying therein in combination with an engine, a hydraulic pump driven by said engine, a hydraulic motor, pipes between the inlet and the exhaust of said motor and the pressure side and the suction side of said pump forming a closed circulating system, means adapted to vary the capacity of said pump independently of the power applied thereto by said engine, a mechanical regulator operatively connected with said engine and having a normal tendency to vary the capacity of said pump in accord with a varying engine speed, operative connections between said regulator and said means, a fluid pressure regulator operatively connected with the pipe leading from the pressure side of said pump, operative connections between said fluid pressure regulator and said connections between said mechanical regulator and the means controlling the capacity of the pump whereby variance in the load upon the hydraulic motor will vary the capacity of said pump without varying the load upon the engine, and manually operative means whereby the volume of fluid passing through said circulating system may be varied.

4. A gear for attaining compensation between driving power and load embodying therein in combination with an engine, a plurality of rotatable cylinders driven by said engine, a casing forming a pressure and a suction chamber communicating respectively with said cylinders, a hydraulic motor, pipes between the inlet and the exhaust of said motor and said pressure chamber and said suction chamber respectively, forming a closed circulating system, a piston mounted in each of said cylinders, a traveler, a pivot thereon, a rotatable member mounted upon said pivot, piston rods connected with said rotatable member and said pistons respectively, means whereby said traveler may be moved toward or from the axis of rotation of said cylinders to vary the effective stroke of said pistons, and the capacity of said cylinders, a mechanical regulator operatively connected with said engine and having a normal tendency to vary the capacity of said cylinders in accord with the varying engine speed, operative connections between said regulator and said means for moving said pivot, a fluid pressure regulator operatively connected with the pipe leading from said pressure chamber, and operative connections between said fluid pressure regulator and said connections between said mechanical regulator and the means for moving said traveler whereby variance in the load upon the hydraulic motor will vary the capacity of said cylinders without varying the load upon the engine.

5. A gear for attaining compensation between driving power and load embodying therein in combination with an engine, a plurality of rotatable cylinders driven by said engine, a casing forming a pressure and a suction chamber communicating respectively with said cylinders, a hydraulic motor, pipes between the inlet and the exhaust of said motor and said pressure chamber and said suction chamber respectively, forming a closed circulating system, a piston mounted in each of said cylinders, a traveler, a pivot, a rotatable member mounted upon said pivot, piston rods connected with said rotatable member and said pistons respectively, a rotatable shaft provided with a gear and means engaging said traveler whereby said traveler may be moved toward or from the axis of rotation of said cylinders to vary the effective stroke of said pistons and the capacity of said cylinders, a mechanical regulator operatively connected with said engine and having a normal tendency to vary the capacity of said cylinders in accord with a varying engine speed, a reciprocatory rack engaging said gear, a flexible connection between said rack and said mechanical regulator, and a fluid pressure regulator operatively connected with the pipe leading from said pressure chamber, and with said rack whereby variance in the load upon the hydraulic motor will vary the capacity of said cylinder without varying the load upon the engine.

6. A gear for attaining compensation between driving power and load embodying therein in combination with an engine, a plurality of rotatable cylinders driven by said engine, a casing forming a pressure and a suction chamber communicating respectively with said cylinders, a hydraulic motor, pipes between the inlet and the exhaust of said motor and said pressure chamber and said suction chamber respectively, forming a closed circulating system, a piston mounted in each of said cylinders, a traveler, a pivot, a rotatable member mounted upon said pivot, piston rods connected with said rotatable member and said pistons respectively, a rotatable shaft provided with a gear and means engaging said traveler whereby said traveler may be moved toward or from the axis of rotation of said cylinders to vary the effective stroke of said pistons and the capacity of said cylinders, a mechanical regulator operatively connected with said engine and having a normal tendency to vary the capacity of said cylinders in accord with a varying engine speed, a reciprocatory rack engaging said gear, a flexible connection between said rack and said mechanical regulator, a fluid pressure regulator operatively connected with the pipe leading from said pressure chamber and with said rack whereby variance in the load upon the hydraulic motor will vary the capacity of said cylinder without varying the load upon the engine, and manually operative means whereby the volume of fluid passing through said circulating system may be varied.

7. A gear for attaining compensation between driving power and load embodying therein in combination with an engine, a plurality of rotatable cylinders driven by said engine, a casing forming a pressure and a suction chamber communicating respectively with said cylinders, a hydraulic motor, pipes between the inlet and the exhaust of said motor and said pressure chamber and said suction chamber respectively, forming a closed circulating system, a piston mounted in each of said cylinders, a traveler, a pivot thereon, a rotatable member mounted on said pivot, piston rods connected with said rotatable member, a rotatable shaft provided with a gear and means engaging said traveler whereby said traveler may be moved toward or from the axis of rotation of said cylinders to vary the effective stroke of said pistons and the capacity of said cylinders, a centrifugal governor driven from said engine, a reciprocatory rack engaging said gear, a reciprocatory screw sleeve, a flexible connection between said sleeve and said rack, a screw shaft coöperating with said sleeve, a clutch mechanism whereby said screw shaft may be operatively connected with said governor whereby there is a normal tendency to vary the capacity of said cylinders in accord with a varying engine speed, and a fluid pressure regulator operatively connected with the pipe leading from said pressure chamber and with said rack whereby variance in the load upon the hydraulic motor will vary the capacity of said cylinder without varying the load upon the engine, and manually operative means whereby the volume of fluid passing through said circulating system may be varied.

8. A gear for attaining compensation between driving power and load embodying therein in combination with an engine, a plurality of rotatable cylinders driven by said engine, a casing forming a pressure and a suction chamber communicating respectively with said cylinders, a hydraulic motor, pipes between the inlet and the exhaust of said motor and said pressure chamber and said suction chamber respectively, forming a closed circulating system, a piston mounted in each of said cylinders, a traveler, a pivot thereon, a rotatable member mounted on said pivot, piston rods connected with said rotatable member, a rotatable shaft provided with a gear and means engaging said traveler whereby said traveler may be moved toward or from the axis of rotation of said cylinders to vary the effective stroke of said pistons and the capacity of said cylinders, a centrifugal governor driven from said engine, a reciprocatory rack engaging said gear, a reciprocatory screw sleeve, a flexible connection between said sleeve and said rack, a screw shaft coöperating with said sleeve, a clutch mechanism whereby said screw shaft may be operatively connected with said governor whereby there is a normal tendency to vary the capacity of said cylinders in accord with a varying engine speed, gears carried by the coöperating members of said clutch mechanism, a gear train connecting said gears, a second clutch mechanism whereby said gear train may be actuated to reverse the movement of said sleeve, actuating means for said second clutch in operative connection with said governor, and a fluid pressure regulator operatively connected with the pipe leading from said pressure chamber and with said rack whereby variance in the load upon the hydraulic motor will vary the capacity of said cylinder without varying the load upon the engine, and manually operative means whereby the volume of fluid passing through said circulating system may be varied.

9. A gear for attaining compensation between driving power and load embodying therein in combination with an engine, a plurality of rotatable cylinders driven by said engine, a casing forming a pressure and a suction chamber communicating respectively with said cylinders, a hydraulic motor, pipes between the inlet and the exhaust of said motor and said pressure chamber and said suction chamber respectively, forming a closed circulating system, a piston mounted in each of said cylinders, a traveler, a pivot thereon, a rotatable member mounted on said pivot, piston rods connected with said rotatable member, a rotatable shaft provided with a gear and means engaging said traveler whereby said traveler may be moved toward or from the axis of rotation of said cylinders to vary the effective stroke of said pistons and the capacity of said cylinders, a centrifugal governor driven from said engine, a reciprocatory rack engaging said gear, a reciprocatory screw sleeve, a flexible connection between said sleeve and said rack, a screw shaft coöperating with said sleeve, a clutch mechanism whereby said screw shaft may be operatively connected with said governor whereby there is a normal tendency to vary the capacity of said cylinders in accord with a varying engine speed, gears carried by the coöperating members of said clutch mechanism, a gear train connecting said gears, a second clutch mechanism whereby said gear train may be actuated to reverse the movement of said sleeve, actuating means for said second clutch in operative connection with said governor, means adapted to be actuated by said sleeve to automatically release said second clutch, and a fluid pressure regulator operatively connected with the pipe leading from said pressure chamber and with said rack whereby variance in the load upon the hydraulic motor will vary the capacity of said cylinder without varying the load upon the engine, and manually operative means whereby the volume of fluid passing through said circulating system may be varied.

10. A gear for attaining compensation between driving power and load embodying therein in combination with an engine, a hydraulic pump driven by said engine, a plurality of hydraulic motors operatively connected respectively with two independently movable load sustaining members, pipes between the pressure and the suction sides of said pump and the inlet and the exhaust of one of said motors, branch pipes leading from said first named pipes to the inlet and the exhaust of said other motor whereby a closed circulating system including both said motors is formed, means adapted to vary the capacity of said pump independently of the power applied thereto by said engine, a mechanical regulator operatively connected with said engine and having a normal tendency to vary the capacity of said pump in accord with a varying engine speed, a fluid pressure regulator operatively connected with the pipe leading from the pressure side of said pump, and operative connections between said mechanical regulator and the means controlling the capacity of the pump whereby variance in the load upon the hydraulic motor will vary the capacity of said pump without varying the load upon the engine.

In testimony whereof I affix my signature in the presence of two witnesses.

GEORG von SAALFELD.

Witnesses:
U. RUEDER,
ARTHUR GUBE.